United States Patent

[11] 3,545,795

[72] Inventors Heinrich Hertel
  Tannenbergalle 36, Berlin;
  Olaf Volkersen, Oberneulander Landsr 44, Bremen, Germany
[21] Appl. No. 789,561
[22] Filed Jan. 7, 1969
[45] Patented Dec. 8, 1970
[73] Assignee Said Volkersen assor. to said Hertel

[54] JOINT
  10 Claims, 8 Drawing Figs.
[52] U.S. Cl. ................................................. 287/20.92, 161/38, 156/309
[51] Int. Cl. .................................................. F16b 5/00
[50] Field of Search ....................................... 161/38, 254, 166; 156/306(back to 2,000,000), 309(All); 287/20, 92, 92(DB), 92(D)

[56] References Cited
UNITED STATES PATENTS

| | | | |
|---|---|---|---|
| 3,078,201 | 2/1963 | Christie | 156/306UX |
| 3,107,195 | 10/1963 | Stegler et al. | 156/309X |
| 3,231,450 | 1/1966 | Riel | 156/309X |

Primary Examiner—David J. Williamowsky
Attorney—Michael S. Striker

ABSTRACT: A joint between two overlapping plate-shaped structural elements. The structural elements have portions which overlap one another and a layer of adhesive material is located between the overlapping portions bonding the same together. The layer of adhesive material has two marginal zones each extending along one edge of the overlap and at least one of these marginal zones has a thickness which is greater than the thickness of the major zone of the adhesive layer intermediate the marginal zones.

PATENTED DEC 8 1970

3,545,795

Inventor:
HEINRICH HERTEL
OLAF VOLKERSEN

By: Michael S. Striker
Attorney

JOINT

BACKGROUND OF THE INVENTION

The present invention relates generally to joints, and more particularly to joints between overlapping structural elements. Still more particularly the invention relates to joints between plate-shaped, sheet-shaped and similarly configured overlapping structural elements.

Specifically, the invention relates to an adhesive joint between two such overlapping elements.

There has long been a requirement for providing an optimum adhesive joint between plate-shaped or sheet-shaped overlapping elements which is capable of withstanding tensile stresses, pressure or shear stresses or combinations thereof acting in the direction of the plane of the so-joined elements. It is well known that where elements of this type are overlapped and joined with a layer of adhesive the distribution of shear stresses in the layer of adhesive is such that stress peaks develop at both edges or ends of the overlap which may be a multiple of the intermediate shear stresses which are to be transmitted through the joint and which, with respect to the intermediate shear stress, become the greater the longer the overlap is in the direction of the force. Where the overlapped ends or portions of the structural elements are not "sharpened," that is do not taper in thickness, the highest shear stress at the ends of a sufficiently large overlap approaches a borderline value which cannot be decreased by further increasing the length of the overlap; this means that the strength of an adhesive joint can not be increased simply by increasing the length of the overlap.

Under certain circumstances it is possible to decrease the stress peaks by having the thickness of the overlapped portions decrease in direction towards the respective edges of the overlap.

Heretofore, however, no adhesive joint of this type, having the desired characteristics, has existed or become known for plate- or sheetlike structural elements, particularly plates or sheets of metal, tubes and analogous elements.

SUMMARY OF THE INVENTION

It is therefore a general object of the present invention to provide a joint of the type set forth above which has the desired characteristics.

More particularly, it is an object of the present invention to provide such a joint wherein two or more structural elements are adhesively connected, and wherein the thus-established adhesive joint is capable of resisting to an optimum extent tensile stresses, pressures and shear stresses, as well as combinations thereof acting in the general plane of the connected structural elements.

In pursuance of the above objects, and others which will become apparent hereafter, one feature of our invention resides in providing a joint between two overlapping structural elements, which joint comprises a pair of structural elements each having a portion of predetermined thickness with these portions overlapping one another. A layer of adhesive material is located between the overlapping portions bonding the same to one another and has two marginal zones each of which extends along one edge of the overlap. At least one of these marginal zones has a thickness which is greater than the thickness of the major zone of the adhesive layer located intermediate the marginal zones.

A decrease or elimination of force peaks or stress peaks resulting from shear forces can be obtained by compensating the nonuniform expansions of the structural elements through making the yieldability of the layer of adhesive material variable, for instance by varying the thickness of the adhesive layer in the direction in which the force acts. This means that an optimum joint, that is a joint having optimum characteristics, is obtained if it is possible to completely or at least substantially completely avoid the nonuniformity of shear stress application to the joint.

We have found that an optimum joint can be obtained utilizing structural elements whose thickness is not tapered if—assuming a constant shear stress in the layer of adhesive material—the differential quotient of the shear stress deformation of the adhesive layer equals the difference of expansion of the structural elements, i.e.

$$\frac{d\delta}{dz} = \epsilon_2 - \epsilon_1$$

If one uses a homogenous adhesive of variable layer thickness, simple calculations based on the above formula yield an equation which identifies the optimum distribution of the thickness of the layer of adhesive, namely $$s_{Lz} = s_{L00} + \frac{G_L}{E_F \cdot s} \cdot z^2$$

In the above equation, sLz stands for the thickness of the adhesive layer at any point z, $s_{L00}$ stands for the thickness of the layer at the point where z equals zero, that is the smallest thickness of the layer, $G_L$ stands for the sliding modulus of the adhesive material, $E_F$ stands for the modulus of elasticity of the structural elements, $s$ stands for the constant wall thickness of the structural elements, z stands for the variable coordinate in the direction of overlap as calculated from the center of the overlap. In an analogous manner, the distribution of the layer-thickness of the adhesive layer at shear stress of the structural elements will yield the equation:

$$s_{Lz} = s_{L00} + \frac{G_L}{G_F \cdot s} \cdot z^2$$

wherein $G_F$ is the sliding modulus of the structural elements.

If the overlapped portions locally have their thickness decreased in an area encompassing only the outermost third of the overlap and if this decrease in thickness is not carried through to the zero value, this will affect the distribution of forces in the total joint only in a very small extent because in the region of the free edges of the overlapped structural elements the load thereon is only small that consequently the amount of extension obtained will remain small. This makes it possible to obtain the desired optimum thickness variation or distribution of the layer of adhesive material by having the thickness of the overlapped portions in the region of their free edge portions decreased by means of a taper or in a stepped manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
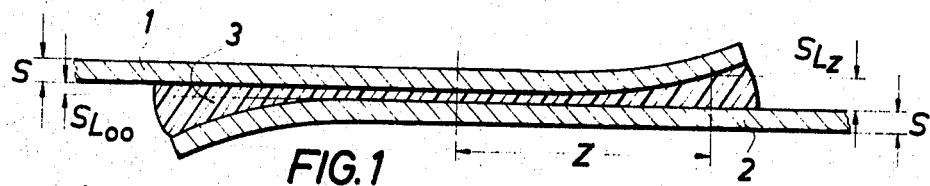
FIG. 1 is a fragmentary sectional elevation illustrating a joint according to one embodiment of our invention.

Discussing firstly the embodiment illustrated in FIG. 1 it will be seen that we have shown therein two platelike or sheetlike structural elements 1 and 2, portions of which are overlapped as illustrated. In this embodiment the edge portions of the overlapped portions are respectively identified with reference numerals 1a and 2a and are bent in direction away from the respectively opposite structural member. Thus, the edge portion 1a is bent away in direction from the facing surface of the structural member 2, and the edge portion 2a of the structural member 2 is bent in direction away from the structural member 1. The thickness of the overlapped portions, including the edge portions 1a and 2a thereof, is not decreased in any way but the spacing between the juxtaposed surfaces of the structural members 1 and 2 is greater in the region of the bent edge portions 1a and 2a than intermediate the same because of the particular bending just described.

A layer 3 of adhesive material is interposed between and bonds together the overlapped portions of the structural members 1 and 2 and it will be seen that in the region of the bent edge portions 1a and 2a the thickness of the layer 3 is greater than in the zone intermediate these edge portions. Reference designation $s$ identifies the constant thickness of the structural members 1 and 2, reference designation $S_{Lz}$ the thickness of the adhesive layer 3 at the point $z$, the reference designation $S_{Loo}$ the thickness of the adhesive layer 3 at the point of smallest thickness of the layer, that is where $z$ equals zero.

In a joint constructed in accordance with the embodiment illustrated in FIG. 1 the shear stresses are evenly or at least substantially evenly distributed.

Figure 2:
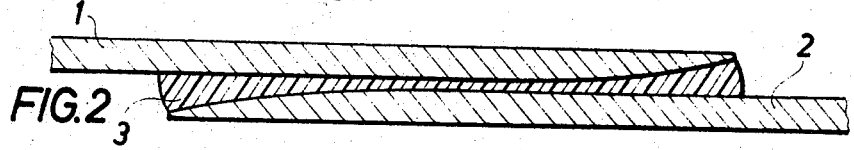
FIG. 2 is a view similar to FIG. 1 but illustrating a somewhat modified embodiment.

The embodiment illustrated in FIG. 2 differs from that of FIG. 1 in that the edge portions 1a' and 2a' of the structural members 1a and 2a are not bent outwardly in direction away from the respective counterparts. In this embodiment the necessary increase in spacing between the facing surfaces of the structural members 1' and 2' is obtained by having the surface of each structural member which faces the other structural member recede away from the other structural member in the region of the respective edge portion 1a' and 2a', as illustrated. This "sharpening" of the edge portions 1a' and 2a' is in form of an arcuate taper and the thickness configuration of the layer 3 of adhesive material which is obtained in this manner provides for uniform or at least substantially uniform distribution of shear stresses in the layer 3.

Figure 3:
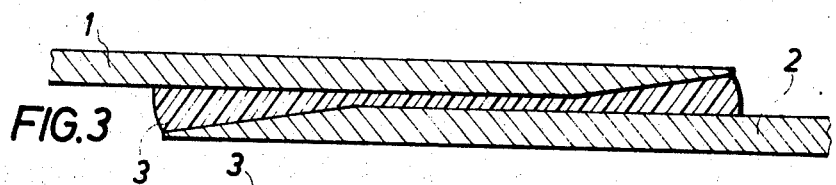
FIG. 3 is a view similar to FIG. 2 but illustrating a slightly different embodiment of the invention.

The embodiment of FIG. 3 is largely reminiscent of that of FIG. 2, and its purposes are the same, the only difference being that instead of an arcuate taper the edge portions 1a'' and 2a'' of the structural members 1'' and 2'' are provided with a straight line taper as illustrated.

Figure 4:
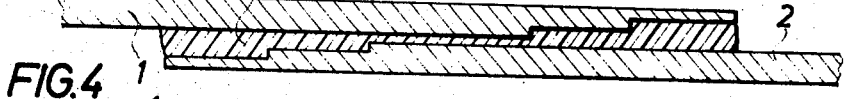
FIG. 4 is a view which is also similar to FIG. 2 but which illustrates still another embodiment of the invention.

Again, the embodiment of FIG. 4 is largely similar to that of FIG. 2, and the results obtained are nearly the same as with the embodiment of FIG. 2. The difference between the embodiment of FIG. 4 versus that of FIG. 2 is that the surfaces of the structural members 1''' and 2''' recede from the respectively opposite structural member in the region of the edge portions 1a''' and 2a''' in stepwise fashion rather than in a tapered fashion as in FIG. 2 or in FIG. 3.

Figure 5:
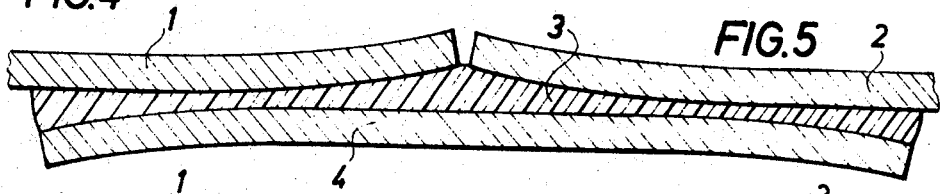
FIG. 5 is another fragmentary sectional elevation of still a further embodiment of the invention.

Coming now to the embodiment illustrated in FIG. 5 it will be seen that this is largely reminiscent of the one shown in FIG. 1. In FIG. 5, however, an additional structural member 4 overlaps the right-hand portion of the structural member 2 and its edge portion 4a—which constitutes a mirror-reversed version of the edge portion 1a of the structural member 1—is located closely adjacent to or abuts against the edge portion 1a of the structural member 1. The right-hand edge portion of the structural member 2 is identified with reference numeral 2aa and constitutes a mirror-reversed version—as far as its configuration is concerned—of the edge portion 2a. FIG. 5 clearly shows that in this embodiment the right-hand size of the joint is in effect a mirror-reversed replica of the left-hand side of the joint, that is of the embodiment illustrated in FIG. 1. In FIG. 5, of course, the structural member 2 constitutes a bridging element for bridging the abutment of the structural members 1 and 4.

Figure 6:
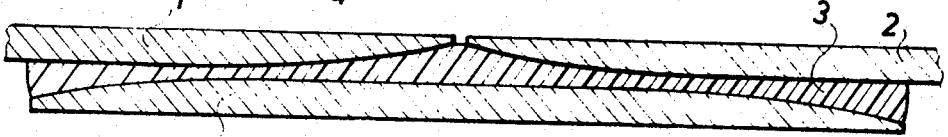
FIG. 6 is a view similar to FIG. 5 but illustrating yet an additional embodiment of the invention.

The embodiment illustrated in FIG. 6 differs from that of FIG. 5 in the manner in which the embodiment of FIG. 2 differs from that of FIG. 1. In other words, the embodiment of FIG. 6 constitutes a mirror-reversed duplication of the embodiment of FIG. 2, just as in effect the embodiment of FIG. 5 constitutes a mirror-reversed duplication of the embodiment in FIG. 1. In FIG. 6 the structural elements 1' and 2' correspond to the structural elements 1' and 2' in FIG. 2. The adhesive layer is again identified by reference numeral 3 and the edge portions 1a' and 2a' correspond to the ones of FIG. 2. The additional structural element is identified with reference numeral 4' and its edge portion 4a' is located closely adjacent to or abuts against the edge portion 1a' of which it constitutes a mirror-reversed configuration as far as its taper is concerned. As in the embodiment of FIG. 5, structural element 2' of FIG. 6 constitutes a bridging member which bridges the abutment between the structural members 1' and 4'.

Figure 7:
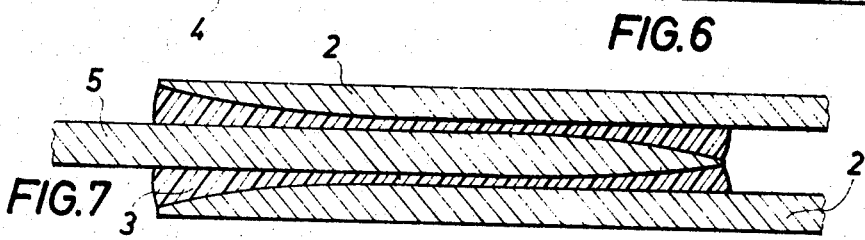
FIG. 7 is also a fragmentary sectional elevation, illustrating yet a further embodiment of the invention.

The embodiment of FIG. 7 is reminiscent of the embodiment illustrated in FIG. 2. Structural members 1' and 2' correspond to structural members 1' and 2' in FIG. 2 and the joint between the same is the same as the joint between the structural members 1' and 2' in FIG. 7. Additionally, however, FIG. 7 comprises a further structural member 5 which is to be joined to the structural members 1' and 2' at that side of the structural member 1' which faces away from the structural member 2'. The edge portion 5a of the structural member 5 is of tapering thickness, that is its surface facing the structural member 1' recedes in direction away therefrom in an arcuate curve. FIG. 7 shows that this is a mirror-reversal of the configuration of the edge portion 2a' of the structural member 2.

Unlike the embodiment of FIG. 2, however, the edge portion 1a' of the structural member 1' is provided at both opposite sides of the structural member 1' with an arcuately receding taper which recedes towards the center of the thickness of the edge portion 1a'.

Figure 8:
FIG. 8 is a view similar to FIG. 7 illustrating still another embodiment of the invention.

Finally, the embodiment of FIG. 8 is the same as that of FIG. 7 except that the tapers of the end portions 1a''', 2a''' and 5a' of the structural members 1''', 2''' and 5', respectively, are straight line as shown in FIG. 3 rather than arcuate as shown in FIG. 2.

Resort to our novel joint provides for a uniform or substantially uniform distribution of stresses in the adhesive layer, as already discussed. The length of the overlap may be selected entirely at will and the novel adhesive joint makes it possible to transmit forces whose magnitude can be selected at will, particularly forces which correspond at least to the strength of the individual structural members themselves.

It should be appreciated that the structural members which can be so connected need of course not be plate-shaped or sheet-shaped, but can also have other configurations, for instance can be tubular or the like.

It will be understood that each of the elements described above, or two or more together, may also find a useful application in other types of constructions differing from the types described above.

While the invention has been illustrated and described as embodied in a joint, it is not intended to be limited to the details shown, since various modifications and structural changes may be made without departing in any way from the spirit of the present invention.

We claim:

1. A joint between two overlapping structural elements which is to withstand tensile stresses, comprising in combination, a pair of structural elements each having a portion of predetermined thickness, said portions overlapping one another from opposite directions; and a layer of adhesive material between said portions bonding the same to one another, said layer having two marginal zones each extending along one edge of the overlap and at least one such marginal zone having a thickness which is greater than the thickness of the major zone of the adhesive layer intermediate said marginal zones, the thickness variation of said layer of adhesive material being in accordance with the equation $$s_{Lz} = s_{L00} + \frac{G_L}{E_F \cdot s} \cdot z^2$$

wherein $S_{Lz}$ stands for the thickness of the layer at any point $z$, $s_{Loo}$ stands for the thickness of the layer at the point of smallest thickness, $G_L$ for the sliding modulus of the adhesive, $E_F$ for the modulus of elasticity of the structural elements, $s$ for the thickness of the structural elements in that part of the overlap where the thickness is constant, and $z$ for the variable coordinate measured from the center of the overlap.

2. A joint between two overlapping structural elements which is to withstand shear stresses, comprising in combination, a pair of structural elements each having a portion of predetermined thickness, said portions overlapping one another from opposite directions; and a layer of adhesive material between said portions bonding the same to one another, said layer having two marginal zones each extending along one edge of the overlap and at least one such marginal zone having a thickness which is greater than the thickness of the major zone of the adhesive layer intermediate said marginal zones, the thickness variation of said layer of adhesive material being in accordance with the equation $$s_{Lz} = s_{L00} + \frac{G_L}{G_F \cdot s} \cdot z^2$$

where $s_{Lz}$ stands for the thickness of the layer at any point $z$, $S_{Loo}$ stands for the thickness of the layer at the point of smallest thickness, $G_L$ for the sliding modulus of the adhesive, $G_F$ for the sliding modulus of the structural elements, $s$ for the thickness of the structural elements in that part of the overlap where the thickness is constant, and $z$ for the variable coordinate measured from the center of the overlap.

3. A joint between two overlapping structural elements which is to withstand shear stresses and tensile stresses, comprising in combination, a pair of structural elements each having a portion of predetermined thickness, said portions overlapping one another from opposite directions; and a layer of adhesive material between said portions bonding the same to one another, said layer having two marginal zones each extending along one edge of the overlap and at least one such marginal zone having a thickness which is greater than the thickness of the major zone of the adhesive layer intermediate said marginal zones, the thickness variation of said layer of adhesive material being in accordance with the equation $$s_{Lz} = s_{L00} + \frac{G_L}{G_F \cdot s} \cdot z^2$$

in case of shear stresses, and $$s_{Lz} = s_{L00} + \frac{G_L}{E_F \cdot s} \cdot z^2$$

in case of tensile stresses, where $S_{Lz}$ stands for the thickness of the layer at any point $z$, $S_{Loo}$ stands for the thickness of the layer at the point of smallest thickness, $G_L$ for the sliding modulus of the adhesive, $G_F$ for the sliding modulus of the structural elements, $E_F$ for the modulus of elasticity of the structural elements, $s$ for the thickness of the structural elements in that part of the overlap where the thickness is constant, and $z$ for the variable coordinate measured from the center of the overlap.

4. A joint as defined in claim 3, said portions each having a surface facing a corresponding surface of the other and each also having an edge portion extending along and defining the respective edge of the overlap; and wherein said edge portions are so configurated that the facing surfaces in the regions of said edge portions recede from one another in such a manner as to at least approximate the desired thickness variations.

5. A joint as defined in claim 1, said edge portions each being curved in direction away from the surface of the respective other structural element.

6. A joint as defined in claim 4, each of said edge portions having an edge and the thickness of said edge portions arcuately tapering in direction towards the associated edge and in direction away from the surface of the respective other structural element.

7. A joint as defined in claim 1, each of said edge portions having an edge and the thickness of said edge portions tapering in a straight line in direction towards the associated edge and in direction away from the surface of the respective other structural element.

8. A joint as defined in claim 1, each of said edge portions having an edge and the thickness of said edge portions decreasing stepwise in direction towards the associated edge and in direction away from the respective other structural element.

9. A joint as defined in claim 1; and further comprising an additional element having an additional portion overlapping one of said portions and being provided with an additional edge portion abutting against the edge portion of the other of said portions, said layer also extending between said one portion and said additional portion and both thereof being configurated so as to provide an additional overlap mirror-symmetrical with reference to the first-mentioned overlap.

10. A joint as defined in claim 1, one of said portions overlapping the other at one side of the latter; and further comprising an additional element having an additional portion overlapping said other portion at the other side thereof and being provided with an additional edge portion, said layer also extending between said other side of said other portion and said additional portion and the edge portion of said other layer and said additional edge portion of said additional layer also having facing surfaces so configurated that in the region of said edge portion of said other layer and said additional edge portion, respectively, said facing surfaces recede from one another in such a manner as to at least approximate the desired thickness variations.